United States Patent
Sato

[19]

[11] Patent Number: 5,579,160
[45] Date of Patent: Nov. 26, 1996

[54] OPTICAL SYSTEM CAPABLE OF CORRECTING IMAGE POSITION

[75] Inventor: Susumu Sato, Chiba, Japan

[73] Assignee: Nikon Corporation, Tokyo, Japan

[21] Appl. No.: 401,278

[22] Filed: Mar. 9, 1995

[30] Foreign Application Priority Data

Mar. 15, 1994 [JP] Japan .................................. 6-070035

[51] Int. Cl.⁶ ................................ G02B 27/64; G03B 7/08
[52] U.S. Cl. ........................... 359/557; 359/554; 396/52; 396/55
[58] Field of Search .................................. 359/554–557, 359/690–692, 676

[56] References Cited

U.S. PATENT DOCUMENTS

| | | | |
|---|---|---|---|
| 4,840,469 | 6/1989 | Moriyama | 359/676 |
| 4,844,602 | 7/1989 | Kitagishi et al. | 359/557 |
| 4,907,868 | 3/1990 | Kitagishi et al. | 359/557 |
| 4,974,950 | 12/1990 | Yamazaki et al. | 359/557 |
| 4,978,205 | 12/1990 | Sato | 359/557 |
| 5,018,845 | 5/1991 | Yamazaki | 359/587 |
| 5,039,211 | 8/1991 | Maruyama | 359/557 |
| 5,121,978 | 6/1992 | Maruyama | 359/557 |
| 5,168,403 | 12/1992 | Omeda et al. | 359/557 |
| 5,270,857 | 12/1993 | Oizumi et al. | 359/557 |
| 5,323,270 | 6/1994 | Sato | 359/557 |
| 5,331,467 | 7/1994 | Sato | 359/557 |
| 5,442,486 | 8/1995 | Sato | 359/690 |
| 5,490,014 | 2/1996 | Suzuki | 359/557 |

FOREIGN PATENT DOCUMENTS 0391533 10/1990 European Pat. Off. .

Primary Examiner—Thong Nguyen
Attorney, Agent, or Firm—Shapiro and Shapiro

[57] ABSTRACT

An optical system includes a front group which is fixed in position in a direction substantially perpendicular to an optical axis, and a rear group which has a positive refractive power and is movable in the direction substantially perpendicular to the optical axis. The optical system satisfies:

$$1.45 < n1 < 1.64$$

$$62 < v1 < 78$$

where $n1$ is the refractive index of an optical member, located at a position closest to the object side, of optical members constituting said front group, and $v1$ is the Abbe's number of said optical member.

14 Claims, 9 Drawing Sheets

OPTICAL SYSTEM CAPABLE OF CORRECTING IMAGE POSITION

BACKGROUND OF THE INVENTION

1. Field of the Invention

The present invention relates to an optical system capable of correcting an image position and, more particularly, to an objective lens system suitable for SLR cameras (Single-Lens Reflex cameras), electronic cameras, and video cameras.

2. Related Background Art

In the present specification, an operation for correcting any variation of an image position caused by a focusing operation, a camera shake, or the like by displacing a predetermined lens group in a direction substantially perpendicular to the optical axis will be referred to as "image position correction".

As a conventional optical system capable of correcting an image position of this type, an optical system disclosed in U.S. Pat. No. 4,978,205 is known. In the optical system disclosed in U.S. Pat. No. 4,978,205, an optical member closest to the object side consists of an anamalous dispersion glass (ED glass) material. Since the ED glass material is soft, a surface, closest to the object side, of the optical system is undesirably easily damaged.

SUMMARY OF THE INVENTION

It is, therefore, an object of the present invention to provide an optical system capable of correcting an image position, which can prevent the surface, closest to the object side, of the optical system from being easily damaged, and has high durability and high imaging performance.

In order to achieve the above-mentioned object, an optical system capable of correcting an image position according to an aspect of the present invention comprises, in the following order from the object side:

a front group which is fixed in position in a direction substantially perpendicular to the optical axis; and a rear group which has a positive refractive power and is movable in the direction substantially perpendicular to the optical axis.

The optical system satisfies:

$$1.45 < n1 < 1.64$$

$$62 < v1 < 78$$

where $n1$ is the refractive index of an optical member, closest to the object side, of those constituting the front group, and $v1$ is the Abbe's number of the optical member.

DETAILED DESCRIPTION OF THE INVENTION

As described above, according to the present invention, the optical system comprises, in the following order from the object side, a front group GF which is fixed in position in the direction substantially perpendicular to the optical axis, and a rear group GR which has a positive refractive power as a whole, and is movable in the direction substantially perpendicular to the optical axis, and corrects the image position by moving the rear group GR in the direction substantially perpendicular to the optical axis.

An optical member L1, closest to the object side, of the front group GF consists of an optical glass material which is not easily damaged, and is advantageous in aberration correction, thereby improving durability while maintaining high imaging performance. More specifically, the optical member L1, closest to the object side, of the front group GF satisfies conditional formulas (1) and (2) below:

$$1.45 < n1 < 1.64 \quad (1)$$

$$62 < v1 < 78 \quad (2)$$

where $n1$: the refractive index of the optical member L1, closest to the object side, of the front group GF $v1$: the Abbe's number of the optical member L1, closest to the object side, of the front group GF Note that the optical member L1, closest to the object side, of the front group GF consists of an optical glass material, and the values of the refractive index $n1$ and the Abbe's number $v1$ of this optical glass member are those for the d-line ($\lambda = 587.6$ nm).

When $n1$ is smaller than the lower limit value of conditional formula (1), the refractive index $n1$ of the optical member L1 becomes too small, and an ED glass lens must be used for satisfactorily correcting the chromatic aberration. For this reason, such small $n1$ is not preferable since it is contrary to the improvement of durability as the object of the present invention.

On the contrary, when $n1$ exceeds the upper limit value of conditional formula (1), the partial dispersion ratio tends to become large, and it becomes difficult to correct the second-order chromatic aberration if the optimal member L1 has a large partial dispersion ratio. Thus, such large $n1$ is not preferable.

When $v1$ is smaller than the lower limit value of conditional formula (2), the partial dispersion ratio tends to become large as in the case wherein $n1$ exceeds the upper limit value of conditional formula (1), and it becomes difficult to correct the second-order chromatic aberration if the optimal member L1 has a large partial dispersion ratio. Such small $v1$ is not, therefore, preferable.

As an optical member with ν1 which exceeds the upper limit value of conditional formula (2), only ED glass and fluorite are currently available. For this reason, such large ν1 is not preferable since it is contrary to the improvement of durability as the object of the present invention.

In order to further improve imaging performance, the optical member L1, closest to the object side, of the front group GF comprises a lens, and preferably satisfies conditional formulas (3) and (4) below:

$$0.2<|f1|/F<2 \qquad (3)$$

$$-1<q<3 \qquad (4)$$

where f1: the focal length of the lens L1

F: the focal length of the entire optical system q: the shape factor of the lens L1

Note that the shape factor q of the lens L1 is expressed by equation (a) below:

$$q=(r2+r1)/(r2-r1) \qquad (a)$$

where r1 is the radius of curvature of a surface, on the object side, of the lens L1, and r2 is the radius of curvature of a surface, on the image side, of the lens L1.

When $|f1|/F$ is smaller than the lower limit value of conditional formula (3), the focal length f1 of the lens L1 becomes too small, and it becomes difficult to correct the chromatic aberration unless an ED glass lens is used. For this reason, such small $|f1|/F$ is not preferable.

On the contrary, when $|f1|/F$ exceeds the upper limit value of conditional formula (3), the focal length f1 of the lens L1 becomes large, and the refraction effect as a lens becomes too small, resulting in, e.g., an increase in total lens length. For this reason, such large $|f1|/F$ is not preferable, either.

When q is smaller than the lower limit value of conditional formula (4), the astigmatism becomes large. Such small q is not, therefore, preferable.

On the contrary, when q exceeds the upper limit value of conditional formula (4), the curvature of a spherical aberration becomes large, and such large q is not preferable, either.

Furthermore, in order to further improve imaging performance upon image position correction, a lens L2, closest to the object side, of the rear group GR preferably satisfies conditional formula (5) below:

$$-2<Q<1 \qquad (5)$$

where

Q: the shape factor of the lens L2

Note that the shape factor Q of the lens L2 is expressed by equation. (b) below:

$$Q=(R2+R1)/(R2-R1) \qquad (b)$$

where R1 is the radius of curvature of a surface, on the object side, of the lens L2, and R2 is the radius of curvature of a surface, on the image side, of the lens L2.

When Q is smaller than the lower limit value of conditional formula (5), the spherical aberration in the rear group GR itself as an image position correction group becomes large, and the flare increases upon image position correction. For this reason, such small Q is not preferable.

On the contrary, when Q exceeds the upper limit value of conditional formula (5), the astigmatism in the rear group GR itself as an image position correction group becomes large, and asymmetricity of the imaging characteristics becomes large upon image position correction. For this reason, such large Q is not preferable, either.

Furthermore, in order to make compact an image position correction mechanism for driving the rear group GR as an image position correction group in the direction substantially perpendicular to the optical axis, the rear group preferably satisfies conditional formula (6) below:

$$0.05<\phi a/F<0.15 \qquad (6)$$

where $\phi a$: the average value of the effective diameters of lens surfaces in the rear group GR When $\phi a/F$ is smaller than the lower limit value of conditional formula (6), the average value of the effective diameters of the lens surfaces in the rear group GR becomes too small, the refractive power arrangement in the front group GR becomes an extreme telephoto type arrangement, and the front group cannot be constituted by a small number of lenses. For these reasons, such small $\phi a/F$ is not preferable.

On the contrary,. when $\phi a/F$ exceeds the upper limit value of conditional formula (6), the average value of the effective diameters of the lens surfaces in the rear group GR becomes too large, and the image position correction mechanism becomes bulky. For these reasons, such large $\phi a/F$ is not preferable.

As for the focusing operation, the front group GF is constituted by, in the following order from the object side, a positive lens group having a positive refractive power, and a negative lens group having a negative refractive power, and the focusing operation is attained by moving the negative lens group along the optical axis. In this manner, when the focusing operation is attained by moving the lens group in the front group GF along the optical axis, a focus group which moves along the optical axis to attain the focusing operation, and an image position correction group, which moves in the direction perpendicular to the optical axis to attain image position correction, can be separated from each other. As a result, it is advantageous in arrangement since a mechanical interference between the focus mechanism and the image position correction mechanism can be avoided.

When the rear group GR is utilized not only for correcting the variation of an image position upon focusing but also for correcting the variation of an image position caused by a camera shake or a vibration of a vehicle (i.e., caused by a vibration of an optical system), since the rear group GR is a compact image position correction group, a lens barrel as a final product can be rendered compact.

DESCRIPTION OF THE PREFERRED EMBODIMENTS

Preferred embodiments of the present invention will be described hereinafter with reference to the accompanying drawings.

In each of the embodiments, an optical system capable of correcting an image position according to the present invention comprises, in the following order from the object side, a front group GF which is fixed in position in a direction substantially perpendicular to the optical axis, and a rear group GR which has a positive refractive power as a whole and is movable in the direction substantially perpendicular to the optical axis, and attains image position correction by moving the rear group GR in the direction substantially perpendicular to the optical axis.

The front group GF comprises, in the following order from the object side, a positive lens group having a positive refractive power, and a negative lens group having a negative refractive power, and attains the focusing operation by moving the negative lens group along the optical axis.

[First Embodiment]

Figure 1:
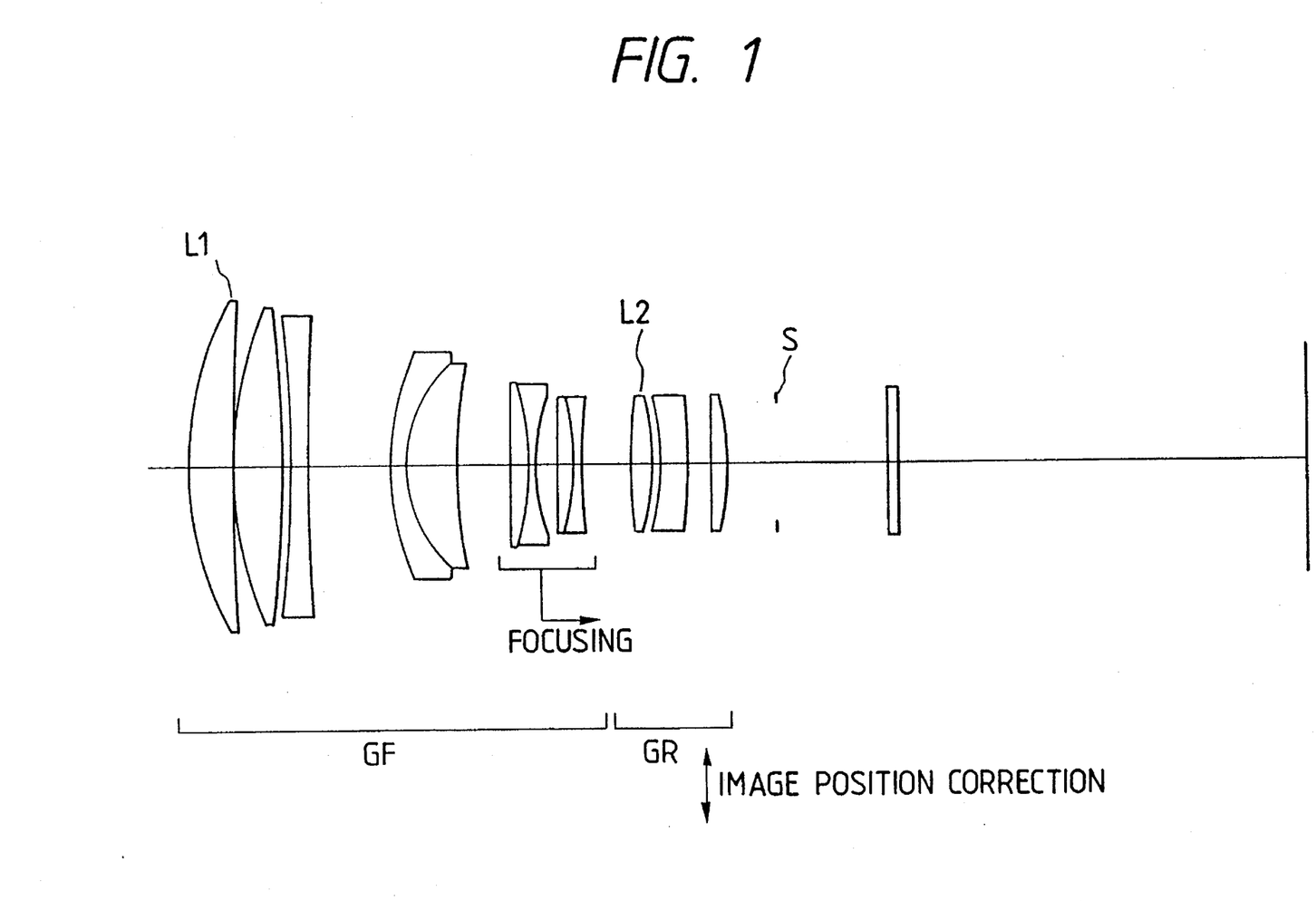
FIG. 1 is a view showing the arrangement of an optical system capable of correcting an image position according to the first embodiment of the present invention.
Figure 2A:
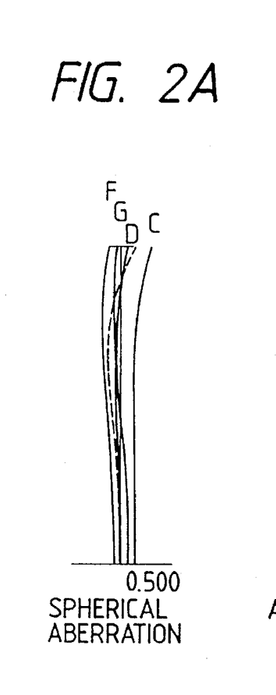
FIGS. 2A to 2F are graphs showing various aberrations in an infinity focusing state in the first embodiment.
Figure 2B:
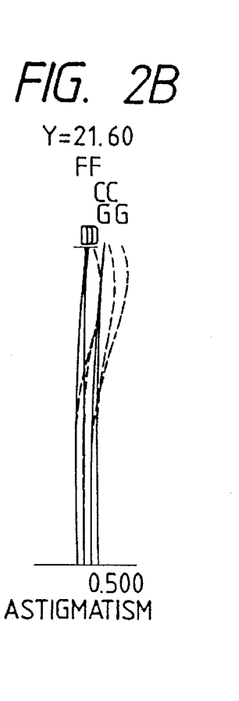
Figure 2C:
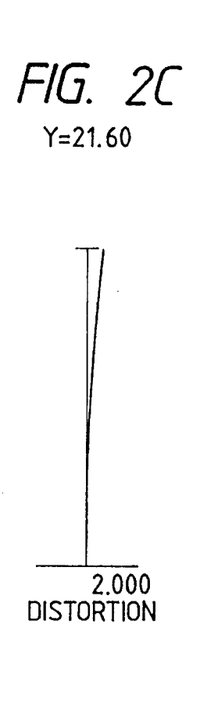
Figure 2D:
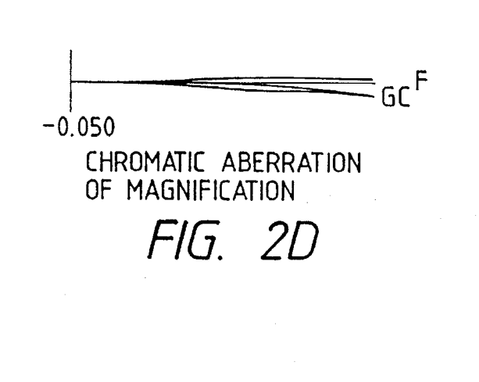
Figure 2E:
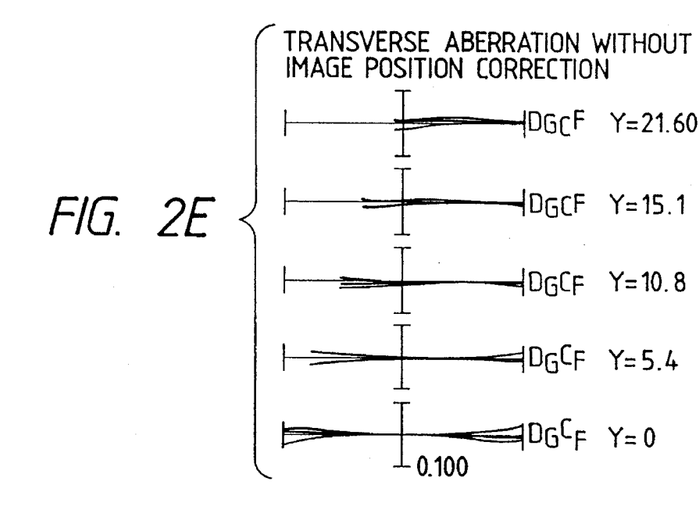
Figure 2F:
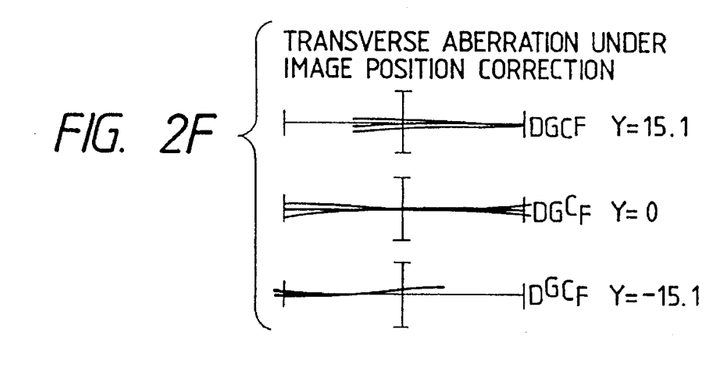
Figure 3A:
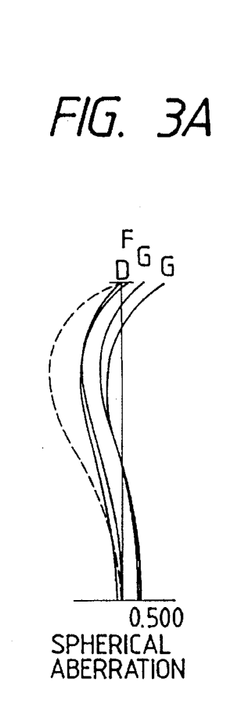
FIGS. 3A to 3F are graphs showing various aberrations in a closest-distance focusing state in the first embodiment.
Figures 3B, 3C:
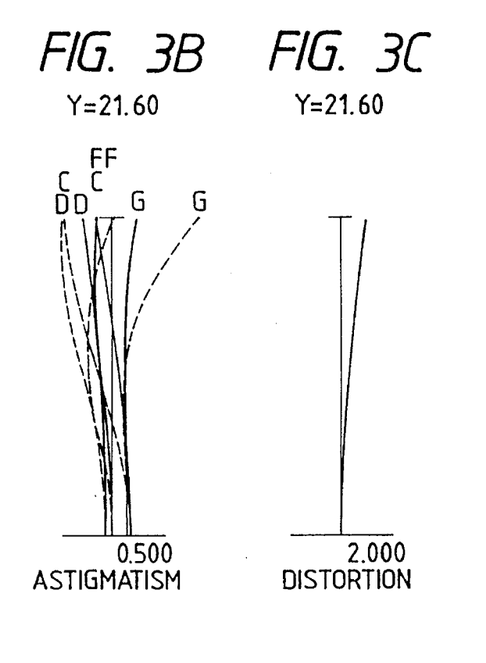
Figure 3D:
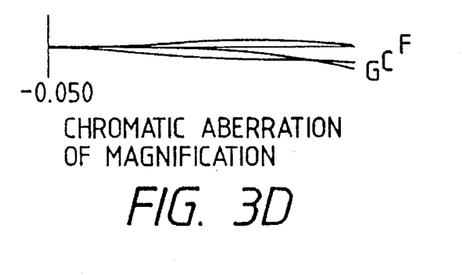
Figure 3E:
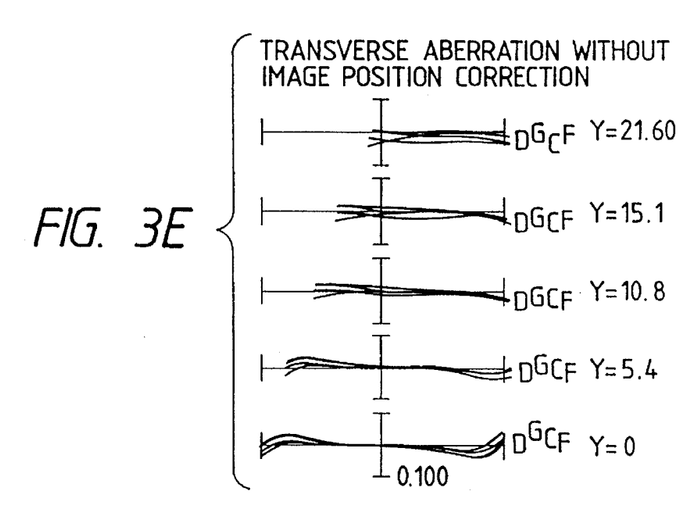
Figure 3F:
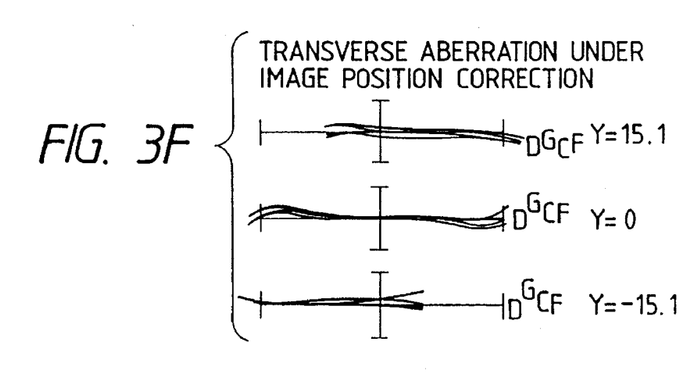

FIG. 1 is a view showing the arrangement of an optical system capable of correcting an image position according to the first embodiment of the present invention.

The optical system shown in FIG. 1 comprises, in the following order from the object side: a front group GF including a positive lens group consisting of a positive meniscus lens L1 with a convex surface facing the object side, a biconvex lens, a biconcave lens, and a cemented lens of a negative meniscus lens with a convex surface facing the object side and a positive meniscus lens with a convex surface facing the object side, and a negative lens group consisting of a cemented lens of a plano-convex lens with a convex surface facing the image side and a biconcave lens, and a cemented lens of a positive meniscus lens with a concave surface facing the object side and a biconcave lens; and a rear group GR consisting of a biconvex lens L2, a negative meniscus lens with a concave surface facing the object side, and a positive meniscus lens with a concave surface facing the object side.

Note that, at the image side of the rear group GR, an aperture stop S is arranged near the rear group GR, and a detachable filter is arranged behind the stop S.

FIG. 1 shows the positions of the lens groups in an infinity focusing state, and the focusing operation for a close-distance object is attained by moving the negative lens group in the front group GF toward the image side. On the other hand, the rear group GR is appropriately moved by a driving actuator (not shown) as a displacement means, in the direction substantially perpendicular to the optical axis, thereby correcting a fluctuation of an image position caused by a vibration of the optical system.

Table 1 below summarizes the data values of the first embodiment of the present invention. In Table 1, FT is the focal length in the infinity focusing state, and $F_{NO}$ is the f-number in the infinity focusing state. Furthermore, numerals, in the leftmost column represent the order of lens surfaces from the object side, r is the radius of curvature of each lens surface, d is the lens surface interval, n and ν are respectively the refractive index and Abbe's number for the d-line (λ=587.6 nm), and φ is the effective diameter of each lens surface in the rear group GR.

TABLE 1

FT = 294
$F_{NO}$ = 4.5

| | r | d | ν | n | φ |
|---|---|---|---|---|---|
| 1 | 70.6476 | 8.800 | 65.77 | 1.46450 | |
| 2 | 823.9535 | 0.100 | | | |
| 3 | 81.1328 | 9.800 | 82.52 | 1.49782 | |
| 4 | −265.3947 | 2.100 | | | |
| 5 | −232.0774 | 3.100 | 35.19 | 1.74950 | |
| 6 | 335.5017 | 17.700 | | | |
| 7 | 57.0005 | 2.400 | 53.72 | 1.69350 | |
| 8 | 26.0214 | 11.200 | 82.52 | 1.49782 | |
| 9 | 104.3768 | (d9 = variable) | | | |
| 10 | ∞ | 3.500 | 31.62 | 1.75692 | |

TABLE 1-continued

| | | | | | |
|---|---|---|---|---|---|
| 11 | −57.4529 | 1.500 | 60.03 | 1.64000 | |
| 12 | 40.2830 | 4.900 | | | |
| 13 | −1346.3912 | 3.200 | 45.87 | 1.54814 | |
| 14 | −52.6093 | 1.500 | 52.30 | 1.74810 | |
| 15 | 143.8299 | (d15 = variable) | | | |
| 16 | 144.3037 | 4.000 | 65.77 | 1.46450 | 27.60 |
| 17 | −59.8882 | 1.800 | | | 27.40 |
| 18 | −44.1039 | 5.500 | 25.50 | 1.80458 | 27.00 |
| 19 | −201.3022 | 4.800 | | | 27.80 |
| 20 | −791.2906 | 3.500 | 27.83 | 1.69911 | 28.20 |
| 21 | −57.5793 | 10.000 | | | 28.40 |
| 22 | ∞ | 23.000 | | | |
| 23 | ∞ | 2.000 | 64.10 | 1.51680 | |
| 24 | ∞ | 81.9589 | | | |

(Variable Interval Upon Focusing)

| | Infinity | Closest Distance (2 m) |
|---|---|---|
| d9 | 11.06595 | 17.59167 |
| d15 | 10.52519 | 3.99947 |

(Condition Corresponding Values)

F = 294.0
f1 = 165.7
r1 = 70.6476
r2 = 823.9535
R1 = 144.3037
R2 = −59.8882
φa = 27.73
(1) n1 = 1.465
(2) ν1 = 65.77
(3) |f1|/F = 0.564
(4) q = 1.188
(5) Q = −0.413
(6) φa/F = 0.094

(Image position Correction Data)

| | Infinity Focusing State | Closest-distance Focusing State |
|---|---|---|
| Image Position Correction Displacement Amount | 1.0 mm (maximum) | 1.0 mm (maximum) |
| Corresponding Image Moving Amount | +1.0 mm (maximum) | +1.0 mm (maximum) |

Note that the positive sign of the image moving amount indicates that the image moves in the same direction as the displacement direction of the image position correction lens group.

FIGS. 2A to 2F and FIGS. 3A to 3F are graphs showing various aberrations in the infinity focusing state and the closest-distance (2m) focusing state. In these graphs, Y is the image height, D is the d-line (λ=587.6 nm), C is the C-line (λ=656.3 nm), F is the F-line (λ=486.1 nm), and G is the g-line (λ=435.6 nm).

In each graph showing astigmatism, a solid curve represents the sagittal image plane, and a broken curve represents the meridional image plane. Also, in each graph showing spherical aberration, a broken curve represents the sine condition, and each graph showing chromatic aberration of magnification is presented with reference to the d-line.

Furthermore, each graph showing transverse aberration under image position correction corresponds to one obtained when the image position correction displacement amount is maximum, i.e., 1 mm.

As can be seen from these graphs, in this embodiment, various aberrations are satisfactorily corrected in addition to those under image position correction.

[Second Embodiment]

Figure 4:
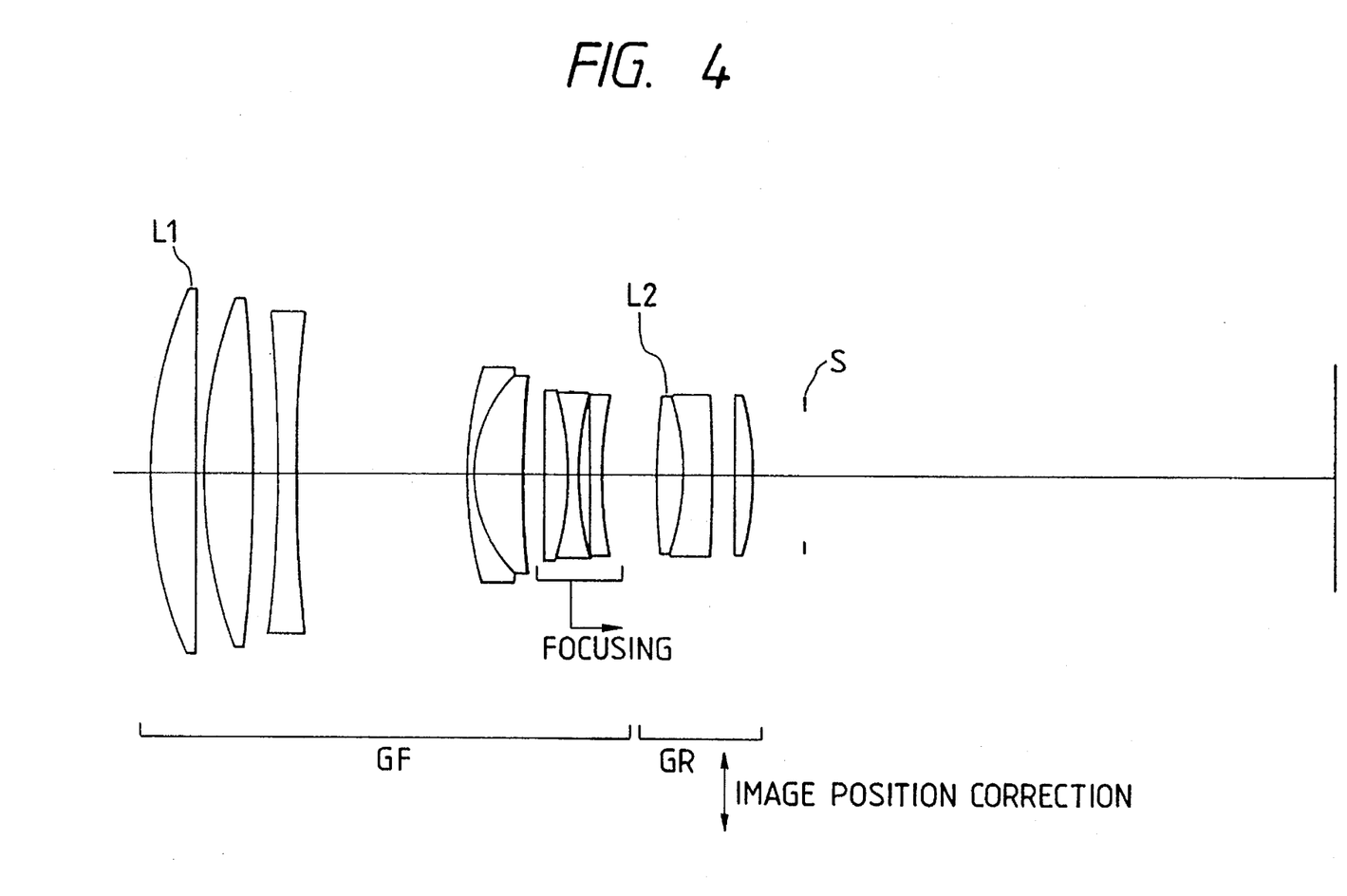
FIG. 4 is a view showing the arrangement of an optical system capable of correcting an image position according to the second embodiment of the present invention.
Figure 5A:
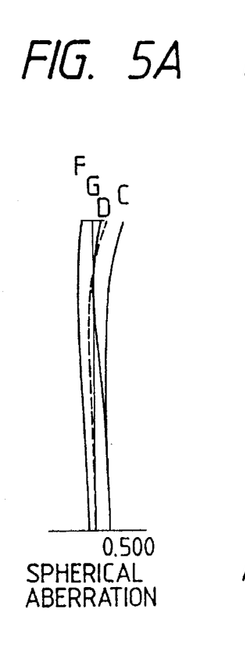
FIGS. 5A to 5F are graphs showing various aberrations in an infinity focusing state in the second embodiment.
Figure 5B:
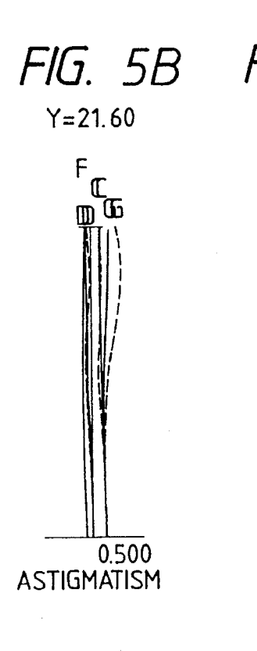
Figure 5C:
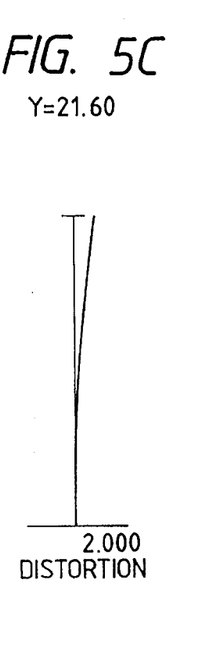
Figure 5D:
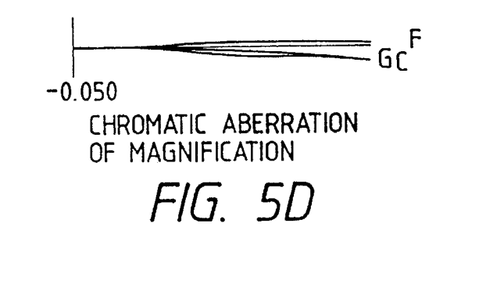
Figure 5E:
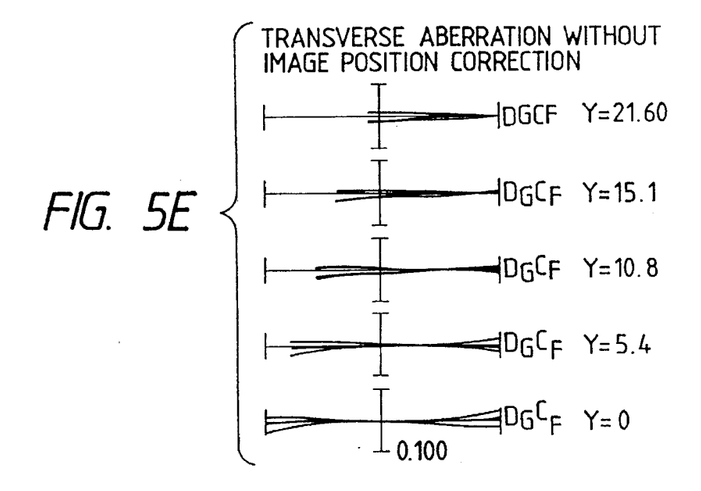
Figure 5F:
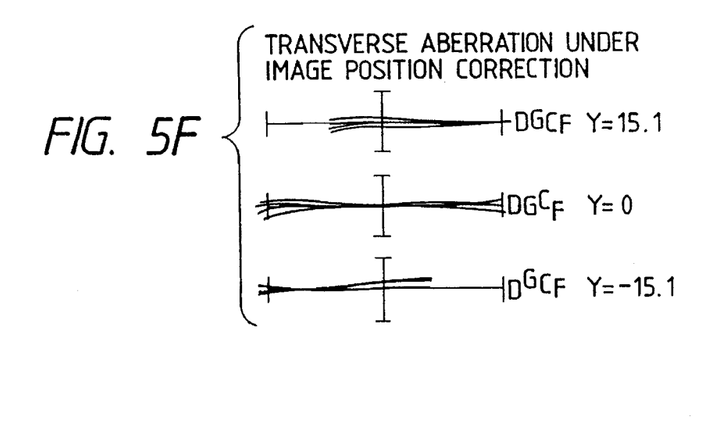
Figure 6A:
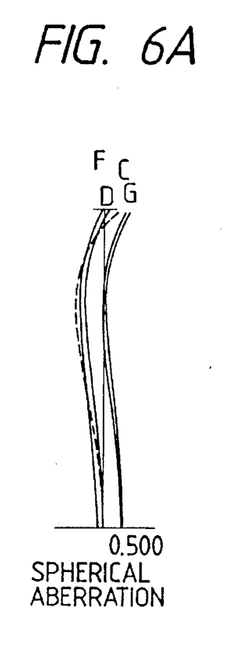
FIGS. 6A to 6F are graphs showing various aberrations in a closest-distance focusing state in the second embodiment.
Figure 6B:
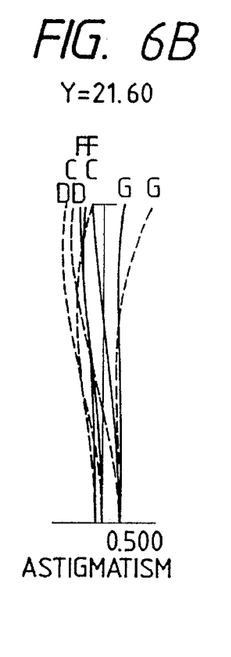
Figure 6C:
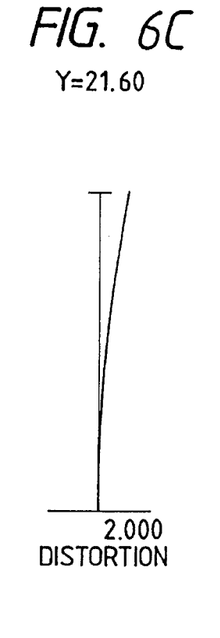
Figure 6D:
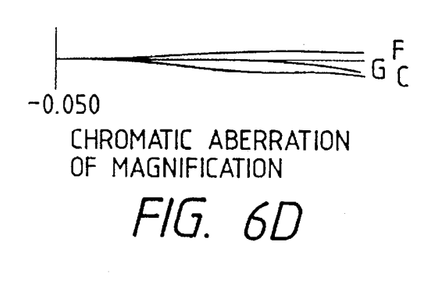
Figure 6E:
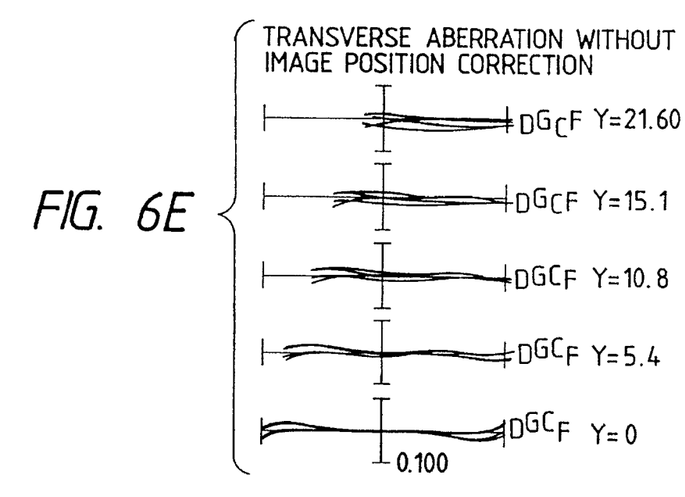
Figure 6F:
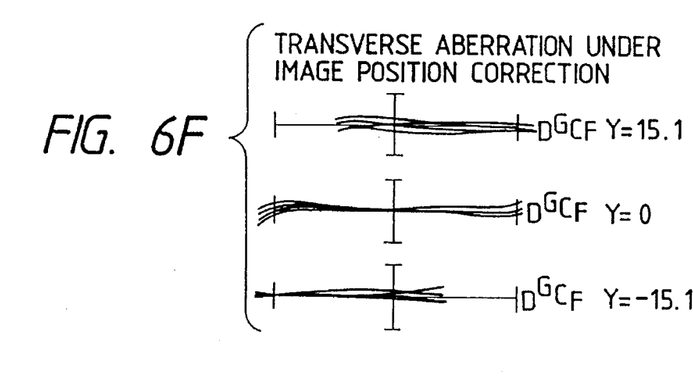

FIG. 4 is a view showing the arrangement of an optical system capable of correcting an image position according to the second embodiment of the present invention.

The optical system shown in FIG. 4 comprises, in the following order from the object side: a front group GF including a positive lens group consisting of a positive meniscus lens L1 with a convex surface facing the object side, a biconvex lens, a biconcave lens, and a cemented lens of a negative meniscus lens with a convex surface facing the object side and a positive meniscus lens with a convex surface facing the object side, and a negative lens group consisting of a cemented lens of a positive meniscus lens with a concave surface facing the object side and a biconcave lens, and a biconcave lens; and a rear group GR consisting of a biconvex lens L2, a negative meniscus lens with a concave surface facing the object side, and a biconvex lens.

Note that, at the image side of the rear group GR, an aperture stop S is arranged near the rear group GR. Also, a filter (not shown) using a detachable metal member is arranged at the object side of the front group GF.

FIG. 4 shows the positions of the lens groups in an infinity focusing state, and the focusing operation for a close-distance object is attained by moving the negative lens group in the front group GF toward the image side.. On the other hand, the rear group GR is appropriately moved by a driving actuator (not shown) as a displacement means, in the direction substantially perpendicular to the optical axis, thereby correcting a fluctuation of an image position caused by a vibration of the optical system.

Table 2 below summarizes the data values of the first embodiment of the present invention. In Table 2, FT is the focal length in the infinity focusing state, and $F_{NO}$ is the f-number in the infinity focusing state. Furthermore, numerals in the leftmost column represent the order of lens surfaces from the object side, r is the radius of curvature of each lens surface, d is the lens surface interval, n and ν are respectively the refractive index and Abbe's number for the d-line (λ=587.6 nm), and φ is the effective diameter of each lens surface in the rear group GR.

TABLE 2

FT = 294
$F_{NO}$ = 4.0

| | r | d | ν | n | φ |
|---|---|---|---|---|---|
| 1 | 96.1521 | 9.000 | 69.98 | 1.51860 | |
| 2 | 2192.0910 | 1.800 | | | |
| 3 | 100.6163 | 10.000 | 82.52 | 1.49782 | |
| 4 | −401.9355 | 5.400 | | | |
| 5 | −290.6599 | 4.000 | 31.62 | 1.75692 | |
| 6 | 385.4505 | 35.600 | | | |
| 7 | 75.9182 | 1.900 | 60.03 | 1.64000 | |
| 8 | 29.0411 | 10.000 | 82.52 | 1.49782 | |
| 9 | 181.9675 | (d9 = variable) | | | |
| 10 | −474.9897 | 4.700 | 31.62 | 1.75692 | |
| 11 | −57.5926 | 2.500 | 60.03 | 1.64000 | |
| 12 | 65.5807 | 2.200 | | | |
| 13 | −1460.4334 | 2.500 | 52.30 | 1.74810 | |
| 14 | 76.1382 | (d14 = variable) | | | |
| 15 | 180.9306 | 4.500 | 65.77 | 1.46450 | 32.00 |
| 16 | −56.3652 | 0.548 | | | 32.00 |
| 17 | −45.6832 | 6.000 | 25.50 | 1.80458 | 31.50 |
| 18 | −268.6981 | 4.300 | | | 32.50 |
| 19 | 1546.8469 | 4.000 | 27.61 | 1.75520 | 33.00 |
| 20 | −66.6445 | 10.800 | | | 33.00 |
| 21 | ∞ | 109.465 | | | |

TABLE 2-continued (Variable Interval Upon Focusing)

| | Infinity | Closest Distance (2.5 m) |
|---|---|---|
| d9 | 4.51604 | 11.92342 |
| d14 | 11.67843 | 4.27105 |

(Condition Corresponding Values)

F = 294.0
f1 = 193.6
r1 = 96.1521
r2 = 2192.091
R1 = 180.9306
R2 = −56.3652
φa = 32.33
(1) n1 = 1.519
(2) ν1 = 69.98
(3) |f1|/F = 0.659
(4) q = 1.092
(5) Q = −0.525
(6) φa/F = 0.110

(Image position Correction Data)

| | Infinity Focusing State | Closest-distance Focusing State |
|---|---|---|
| Image Position Correction Displacement Amount | 1.0 mm (maximum) | 1.0 mm (maximum) |
| Corresponding Image Moving Amount | +1.0 mm (maximum) | +1.0 mm (maximum) |

Note that the positive sign of the image moving amount indicates that the image moves in the same direction as the displacement direction of the image position correction lens group.

FIGS. 5A to 5F and FIGS. 6A to 6F are graphs showing various aberrations in the infinity focusing state and the closest-distance (2.5m) focusing state. In these graphs, Y is the image height, D is the d-line (λ=587.6 nm), C is the C-line (λ=656.3 nm), F is the F-line (λ=486.1 nm), and G is the g-line (λ=435.6 nm).

In each graph showing astigmatism, a solid curve represents the sagittal image plane, and a broken curve represents the meridional image plane. Also, in each graph showing spherical aberration, a broken curve represents the sine condition, and each graph showing chromatic aberration of magnification is presented with reference to the d-line.

Furthermore, each graph showing transverse aberration under image position correction corresponds to one obtained when the image position correction displacement amount is maximum, i.e., 1 mm.

As can be seen from these graphs, in this embodiment, various aberrations are satisfactorily corrected in addition to those under image position correction.

[Third Embodiment]

Figure 7:
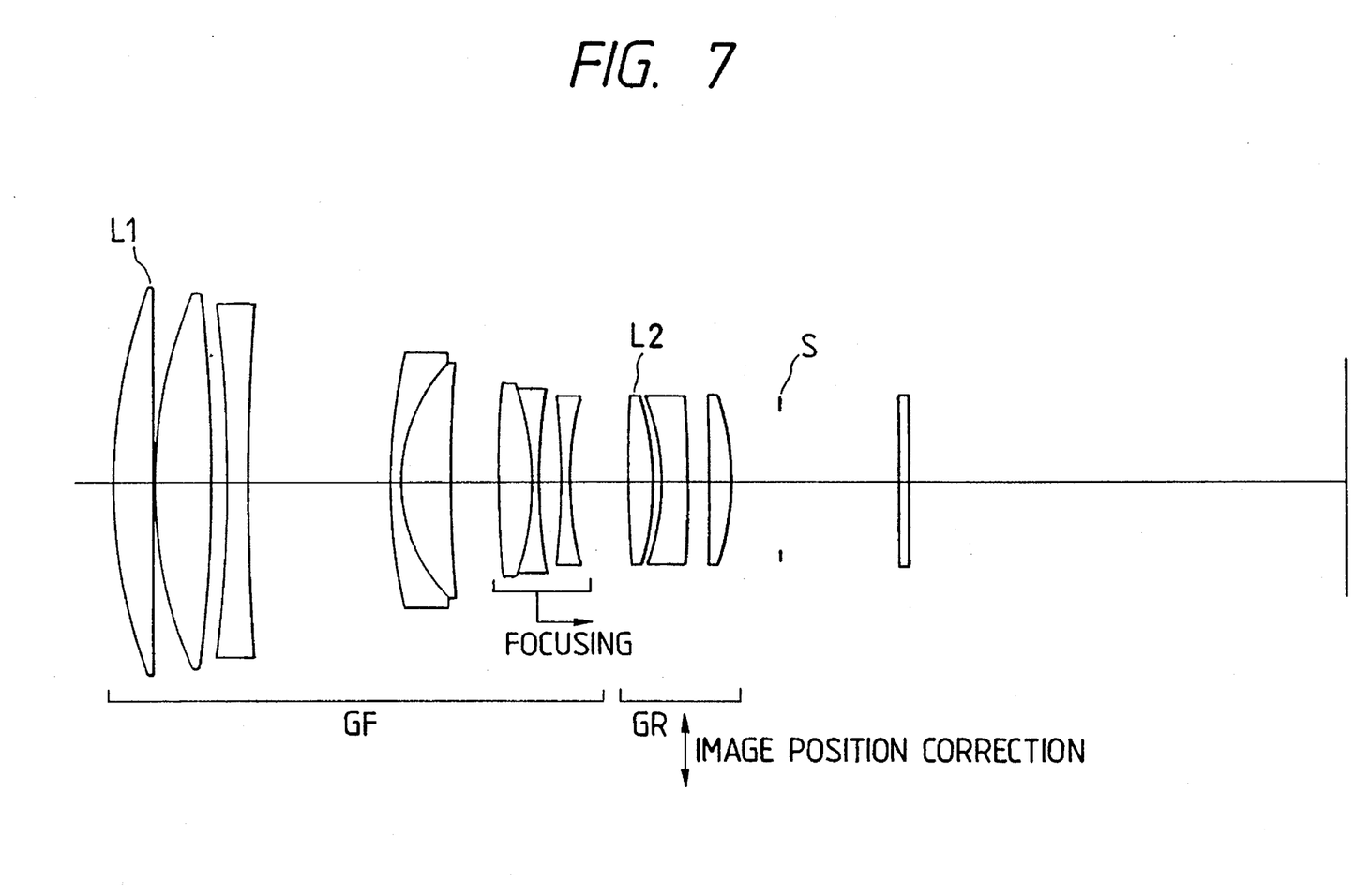
FIG. 7 is a view showing the arrangement of an optical system capable of correcting an image position according to the third embodiment of the present invention.
Figure 8A:
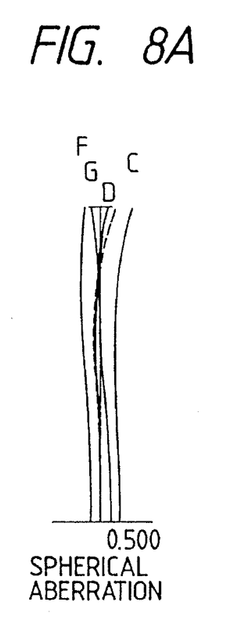
FIGS. 8A to 8F are graphs showing various aberrations in an infinity focusing state in the third embodiment.
Figure 8B:
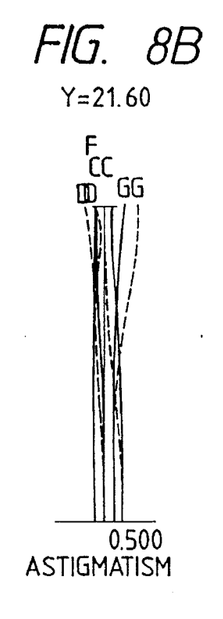
Figure 8C:
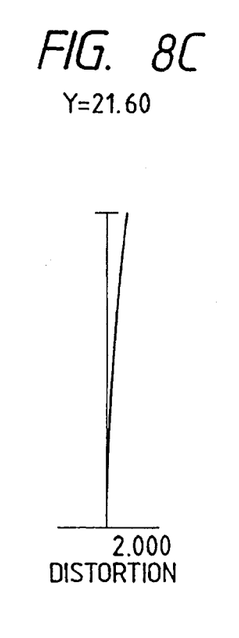
Figure 8D:
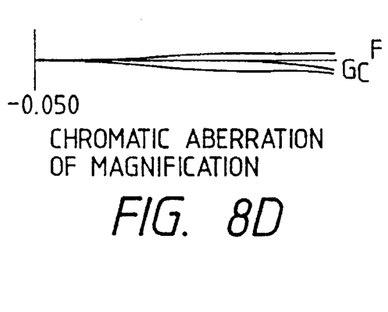
Figure 8E:
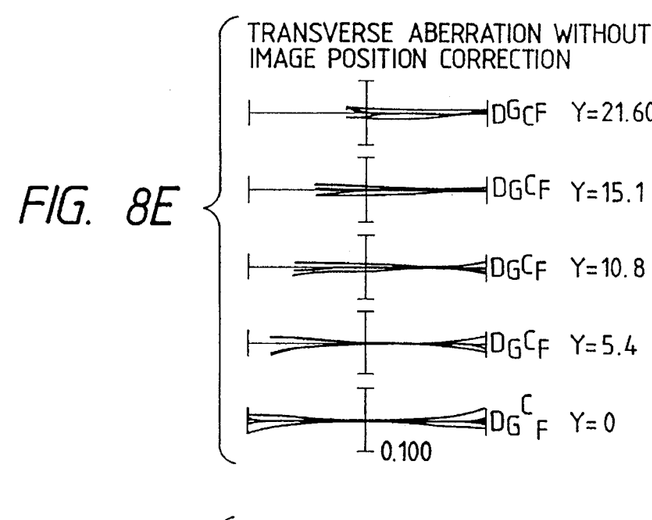
Figure 8F:
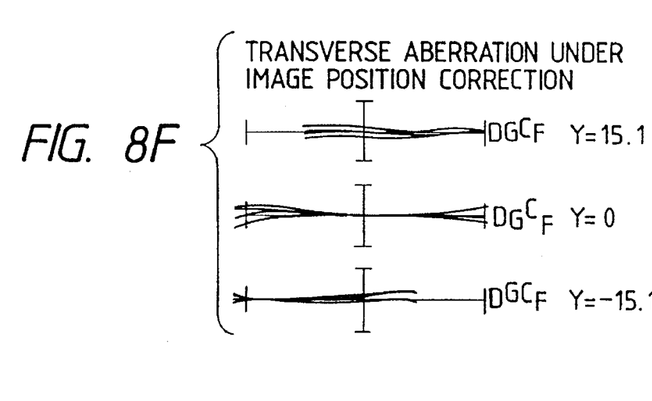
Figure 9A:
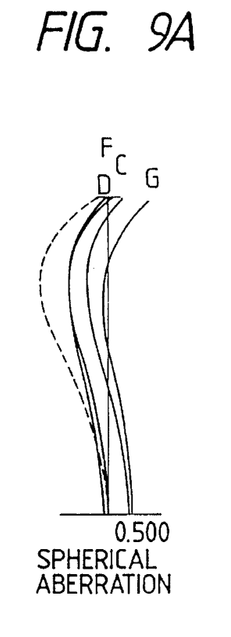
FIGS. 9A to 9F are graphs showing various aberrations in a closest-distance focusing state in the third embodiment.
Figure 9B:
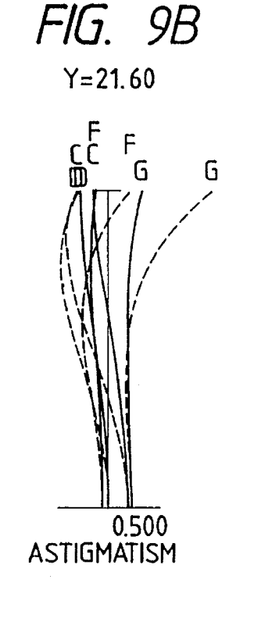
Figure 9C:
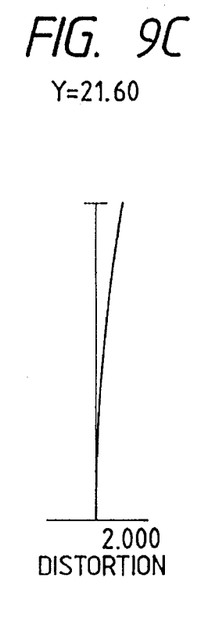
Figure 9D:
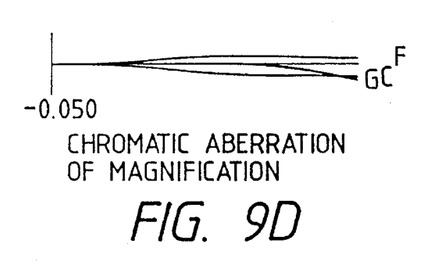
Figure 9E:
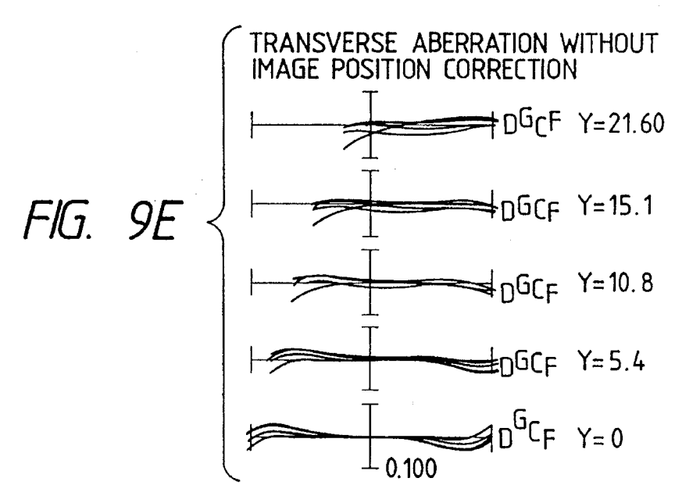
Figure 9F:
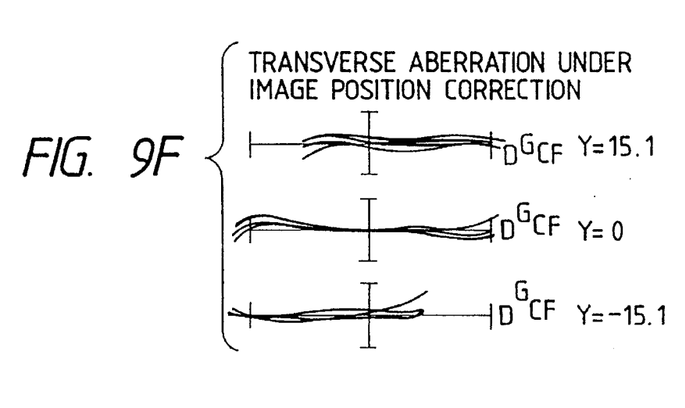

FIG. 7 is a view showing the arrangement of an optical system capable of correcting an image position according to the third embodiment of the present invention.

The optical system shown in FIG. 7 comprises, in the following order from the object side: a front group GF including a positive lens group consisting of a positive meniscus lens L1 with a convex surface facing the object side, a biconvex lens, a biconcave lens, and a cemented lens of a negative meniscus lens with a convex surface facing the object side and a positive meniscus lens with a convex surface facing the object side, and a negative lens group consisting of a cemented lens of a biconvex lens and a biconcave lens, and a biconcave lens; and a rear group GR consisting of a biconvex lens L2, a negative meniscus lens with a concave surface facing the object side, and a positive meniscus lens with a concave surface facing the object side.

Note that, at the image side of the rear group GR, an aperture stop S is arranged near the rear group GR, and a detachable filter is arranged behind the stop S.

FIG. 7 shows the positions of the lens groups in an infinity focusing state, and the focusing operation for a close-distance object is attained by moving the negative lens group in the front group GF toward the image side. On the other hand, the rear group GR is appropriately moved by a driving actuator (not shown) as a displacement means, in the direction substantially perpendicular to the optical axis, thereby correcting a fluctuation of an image position caused by a vibration of the optical system.

Table 3 below summarizes the data values of the third embodiment of the present invention. In Table 3, FT is the focal length in the infinity focusing state, and $F_{NO}$ is the f-number in the infinity focusing state. Furthermore, numerals in the leftmost column represent the order of lens surfaces from the object side, r is the radius of curvature of each lens surface, d is the lens surface interval, n and ν are respectively the refractive index and Abbe's number for the d-line (λ=587.6 nm), and φ is the effective diameter of each lens surface in the rear group GR.

TABLE 3

FT = 300
$F_{NO}$ = 4.0

| | r | d | ν | n | φ |
|---|---|---|---|---|---|
| 1 | 100.0816 | 8.200 | 65.77 | 1.46450 | |
| 2 | 12925.7000 | 0.100 | | | |
| 3 | 88.4396 | 10.700 | 82.52 | 1.49782 | |
| 4 | −375.6027 | 3.500 | | | |
| 5 | −314.3022 | 4.300 | 31.62 | 1.75692 | |
| 6 | 376.0759 | 29.500 | | | |
| 7 | 117.6603 | 2.000 | 60.03 | 1.64000 | |
| 8 | 33.3901 | 10.000 | 82.52 | 1.49782 | |
| 9 | 349.1704 | (d9 = variable) | | | |
| 10 | 241.3745 | 6.000 | 31.62 | 1.75692 | |
| 11 | −59.9463 | 1.800 | 67.87 | 1.59319 | |
| 12 | 101.3219 | 4.100 | | | |
| 13 | −146.0549 | 1.800 | 43.35 | 1.84042 | |
| 14 | 62.0532 | (d14 = variable) | | | |
| 15 | 223.5495 | 5.000 | 69.98 | 1.51860 | 31.40 |
| 16 | −60.3073 | 1.600 | | | 31.40 |
| 17 | −43.2315 | 5.500 | 25.50 | 1.80458 | 31.00 |
| 18 | −325.5062 | 4.400 | | | 32.20 |
| 19 | −2967.4938 | 4.500 | 28.19 | 1.74000 | 33.00 |
| 20 | −56.5331 | 10.000 | | | 33.20 |
| 21 | ∞ | 23.700 | | | |
| 22 | ∞ | 2.000 | 64.10 | 1.51680 | |
| 23 | ∞ | 88.769 | | | |

(Variable Interval Upon Focusing)

| | Infinity | Closest Distance (2.5 m) |
|---|---|---|
| d9 | 9.46857 | 17.84835 |
| d15 | 12.09228 | 3.71250 |

(Condition Corresponding Values)

F = 300.2
f1 = 217.1
r1 = 100.0816
r2 = 12925.7
R1 = 223.5495
R2 = −60.3073
φa = 32.03
(1) n1 = 1.465
(2) ν1 = 65.77

TABLE 3-continued (3) |f1|/F = 0.723
(4) q = 1.016
(5) Q = −0.575
(6) φa/F = 0.107

(Image position Correction Data)

| | Infinity Focusing State | Closest-distance Focusing State |
|---|---|---|
| Image Position Correction Displacement Amount | 1.0 mm (maximum) | 1.0 mm (maximum) |
| Corresponding Image Moving Amount | +1.0 mm (maximum) | +1.0 mm (maximum) |

Note that the positive sign of the image moving amount indicates that the image moves in the same direction as the displacement direction of the image position correction lens group.

FIGS. 8A to 8F and FIGS. 9A to 9F are graphs showing various aberrations in the infinity focusing state and the closest-distance (2.5m) focusing state. In these graphs, Y is the image height, D is the d-line (λ=587.6 nm), C is the C-line (λ=656.3 nm), F is the F-line (λ=486.1 nm), and G is the g-line (λ=435.6 nm).

In each graph showing astigmatism, a solid curve represents the sagittal image plane, and a broken curve represents the meridional image plane. Also, in each graph showing spherical aberration, a broken curve represents the sine condition, and each graph showing chromatic aberration of magnification is presented with reference to the d-line.

Furthermore, each graph showing transverse aberration under image position correction corresponds to one obtained when the image position correction displacement amount is maximum, i.e., 1 mm.

As can be seen from these graphs, in this embodiment, various aberrations are satisfactorily corrected in addition to those under image position correction.

In each of the above embodiments, the aperture stop is arranged at the image side of the rear group GR. Alternatively, the aperture stop may be arranged at a nearby position on the object side of the rear group GR.

In each of the above embodiments, an image position correction of 1 mm is performed on the image plane. However, it is possible to perform image position correction of more than or less than 1 mm, as a matter of course.

When the optical system capable of correcting an image position in each of the above embodiments is used in an anti-vibration optical system for correcting the variation of an image position caused by a camera shake or a vibration of a vehicle (i.e., caused by a vibration of an optical system), a driving mechanism and a sensor described in, e.g., U.S. patent application Ser. No. 08/628,192 filed on Apr. 5, 1996 which is a continuation of U.S. patent application Ser. No. 08/129,580 (filed Sep. 30, 1993, now abandoned) are used as a driving mechanism for performing image position correction and a sensor for detecting the vibration of the optical system. The present invention references the above U.S. patent application.

As described above, according to each of the above embodiments, an optical member, closest to the object side, in an optical system adopts an optical glass material which has high durability and is advantageous in aberration correction. Therefore, the optical system is not easily damaged in use, and can be easily handled.

When the optical member, closest to the object side, in the optical system is used as a lens and protective glass, the weight of the optical system can be reduced.

What is claimed is:

1. An optical system capable of correcting an image position, comprising, in the following order from the object side:

a front group which is fixed in position in a direction substantially perpendicular to an optical axis; and a rear group which has a positive refractive power and is movable in the direction substantially perpendicular to the optical axis, wherein said optical system satisfies:

$$1.45 < n1 < 1.64$$

$$62 < v1 < 78$$

$$0.05 < \phi a/F < 0.15$$

where $n1$ is the refractive index of an optical member, located at a position closest to the object side, of optical members constituting said front group, $v1$ is the Abbe's number of said optical member, $\phi a$ is the average value of effective diameters of lens surfaces of lenses constituting said rear group, and F is the focal length of said optical system.

2. An optical system according to claim 1, wherein said optical member located at the position closest to the object side in said front group comprises a lens, said lens satisfies:

$$0.2 < |f1|/F < 2$$

where f1 is the focal length of said lens, a shape factor q of said lens is expressed by:

$$(r2+r1)/(r2-r1)=q$$

where r1 is the radius of curvature of a surface, at the object side, of said lens, and r2 is the radius of curvature of a surface, at the image side, of said lens, and the shape factor q satisfies:

$$-1 < q < 3.$$

3. An optical system according to claim 1, wherein said rear group comprises at least one positive lens and at least one negative lens.

4. An optical system according to claim 1, wherein a shape factor q of a lens located at a position closest to the object side in said rear group is expressed by:

$$(R2+R1)/(R2-R1)=q$$

where R1 is the radius of curvature of a surface, at the object side, of said lens, and R2 is the radius of curvature of a surface, at the image side, of said lens, and the shape factor q satisfies:

$$-2 < q < 1.$$

5. An optical system according to claim 1, wherein said front group comprises, in the following order from the object side, a positive lens group having a positive refractive power, and a negative lens group having a negative refractive power, and said negative lens group is movable along the optical axis.

6. An optical system according to claim 1, wherein said rear group moves in the direction substantially perpendicular to the optical axis to correct a variation of an image position caused by a vibration of said optical system.

7. An optical system according to claim 1, wherein an aperture stop is arranged in an optical path between an imaging position of said optical system and said front group.

8. An optical system capable of correcting an image position, comprising, in the following order from the object side:

a front group which is fixed in position in a direction substantially perpendicular to an optical axis; and a rear group which has a positive refractive power and is movable in the direction substantially perpendicular to the optical axis, wherein said optical system satisfies:

$$0.05 < \phi a/F < 0.15$$

where $\phi a$ is the average value of effective diameters of lens surfaces of lenses constituting said rear group, and F is the focal length of said optical system.

9. An optical system according to claim 8, wherein an optical member located at a position closest to the object side in said front group comprises a lens, said lens satisfies:

$$0.2 < |f1|/F < 2$$

where f1 is the focal length of said lens, a shape factor q of said lens is expressed by:

$$(r2+r1)/(r2-r1)=q$$

where r1 is the radius of curvature of a surface, at the object side, of said lens, and r2 is the radius of curvature of a surface, at the image side, of said lens, and the shape factor q satisfies:

$$-1 < q < 3.$$

10. An optical system according to claim 8, wherein said rear group comprises at least one positive lens and at least one negative lens.

11. An optical system according to claim 8, wherein a shape factor q of a lens located at a position closest to the object side in said rear group is expressed by:

$$(R2+R1)/(R2-R1)=q$$

where R1 is the radius of curvature of a surface, at the object side, of said lens, and R2 is the radius of curvature of a surface, at the image side, of said lens, and the shape factor q satisfies:

$$-2 < q < 1.$$

12. An optical system according to claim 8, wherein said front group comprises, in the following order from the object side, a positive lens group having a positive refractive power, and a negative lens group having a negative refractive power, and said negative lens group is movable along the optical axis.

13. An optical system according to claim 8, wherein said rear group moves in the direction substantially perpendicular to the optical axis to correct a variation of an image position caused by a vibration of said optical system.

14. An optical system according to claim 8, wherein an aperture stop is arranged in an optical path between an imaging position of said optical system and said front group.

* * * * *